United States Patent
Dai et al.

(10) Patent No.: US 12,479,144 B2
(45) Date of Patent: Nov. 25, 2025

(54) HALOGEN-FREE MODIFIED HIGH-FILLING RECYCLABLE PLASTIC BOARD AND METHOD OF FORMING THE SAME

(71) Applicant: Zhejiang Kingdom New Material Group Co., Ltd., Jiaxing (CN)

(72) Inventors: Huibin Dai, Jiaxing (CN); Lijie Dong, Jiaxing (CN); Xin Li, Jiaxing (CN); Zhongfei Zhang, Jiaxing (CN); Tao Wang, Jiaxing (CN); Mengfei Li, Jiaxing (CN); Jiangchuan Cao, Jiaxing (CN)

(73) Assignee: ZHEJIANG KINGDOM NEW MATERIAL GROUP CO., LTD., Jiaxing (CN)

( * ) Notice: Subject to any disclaimer, the term of this patent is extended or adjusted under 35 U.S.C. 154(b) by 330 days.

(21) Appl. No.: 18/163,450

(22) Filed: Feb. 2, 2023

(65) Prior Publication Data

US 2023/0173730 A1   Jun. 8, 2023

Related U.S. Application Data

(63) Continuation of application No. PCT/CN2021/130406, filed on Nov. 12, 2021.

(30) Foreign Application Priority Data

Oct. 29, 2021   (CN) .......................... 202111274751.9

(51) Int. Cl.
| | |
|---|---|
| *B29C 48/00* | (2019.01) |
| *B29C 48/07* | (2019.01) |
| *B29K 101/00* | (2006.01) |
| *C08G 63/06* | (2006.01) |
| *C08K 3/013* | (2018.01) |
| *C08K 5/1515* | (2006.01) |

(52) U.S. Cl.
CPC ........ *B29C 48/023* (2019.02); *B29C 48/0014* (2019.02); *B29C 48/07* (2019.02); *C08G 63/065* (2013.01); *C08K 3/013* (2018.01); *C08K 5/1515* (2013.01); *B29C 2791/006* (2013.01); *B29C 2795/007* (2013.01); *B29C 2948/92209* (2019.02); *B29K 2101/00* (2013.01)

(58) Field of Classification Search
CPC ... B29C 48/023; B29C 48/0014; B29C 48/07; B29C 2948/92209; B29C 2791/006; B29C 2795/007; C08K 3/013; C08K 5/1515; C08G 63/065; B29K 2101/00
See application file for complete search history.

(56) References Cited

FOREIGN PATENT DOCUMENTS

| | | |
|---|---|---|
| CN | 105585702 A | 5/2016 |
| CN | 108162540 A | 6/2018 |
| CN | 109944411 A | 6/2019 |
| KR | 1020190143362 A | 12/2019 |

OTHER PUBLICATIONS

Dai et al., CN 109944411, Jun. 28, 2019 (machine translation) (Year: 2019).*
Xiwei Zhang, Preparation and Performance Research of New High-Barrier Polyester Bottle-Grade Chips, Document from Chinese Doctoral Dissertations and Masters Theses Full-Text Database, Engineering Science and Technology I (2016), 5 pages and its English translation, 4 pages.

* cited by examiner

*Primary Examiner* — Cheng Yuan Huang
(74) *Attorney, Agent, or Firm* — Muncy, Geissler, Olds & Lowe, P.C.

(57) ABSTRACT

A halogen-free modified high-filling recyclable plastic board is provided in this disclosure, which includes a substrate layer and a printed layer and a protective layer disposed sequentially on the substrate layer from bottom to top. Raw materials of the substrate layer include, by weight in percent, 20 to 25% of PEAT resin, 70 to 75% of stone powder, 0.5 to 0.8% of chain extender, 1 to 2% of white mineral oil, 3 to 6% of PE, and 0.4 to 0.8% of stearic acid. The plastic board according to the present disclosure is formed using a hot press process, without glue bonding and with good integrity; and the manufactured board is large in surface tension, its surface is easy to be processed and a substrate layer thereof has good compatibility with a printed layer and a protective layer, which can be recycled as a whole.

8 Claims, No Drawings

HALOGEN-FREE MODIFIED HIGH-FILLING RECYCLABLE PLASTIC BOARD AND METHOD OF FORMING THE SAME

TECHNICAL FIELD

The present disclosure relates to the field of plastic flooring technology, and more particularly to a halogen-free modified high-filling recyclable plastic board and a method of forming the same.

BACKGROUND ART

At present, commercially available plastic floors are generally with pvc as a main plastic raw material. Although its products are environmentally friendly when used, they may be decomposed and toxic gases such as hydrogen chloride and dioxins may be released in processing and heating. With deepening of people's concept of environmental protection, increasingly more calls for halogen-free products emerges in the market. Conventional halogen-free plastic materials suffer from their own drawbacks. For example, for Poly Ethylen (PE), although a large amount of stone powder can be filled, but with a large expansion ratio; boards molded with Polypropylene (PP) materials are with a small tension on its surface, with relatively difficult subsequent surface processing; and a melting point of a polyethylene terephthalate (PET) material is high and it is brittle, which cannot be filled with a large amount of stone powder.

SUMMARY

In view of problems described above, a halogen-free modified high-filling recyclable plastic board is provided in this disclosure, which is formed using a hot press process, without glue bonding and with good integrity; and the manufactured board is large in surface tension, its surface is easy to be processed and a substrate layer thereof has good compatibility with a printed layer and a protective layer, which can be recycled as a whole.

Technical schemes adopted in this disclosure are as follows. A halogen-free modified high-filling recyclable plastic board is provided in this disclosure, which includes a substrate layer and a printed layer and a protective layer disposed sequentially on the substrate layer from bottom to top.

Raw materials of the substrate layer include, by weight in percent, 20 to 25% of PEAT resin, 70 to 75% of stone powder, 0.5 to 0.8% of chain extender, 1 to 2% of white mineral oil, 3 to 6% PE, and 0.4 to 0.8% stearic acid.

Specifically, the PEAT resin can be polyethylene terephthalate-co-polyethylene adipate, which is condensed and prepared by esterification reaction of PTA (Pure Terephthalic Acid), adipic acid, ethylene glycol, phosphoric acid and its ester derivatives, diethylene glycol, and a catalyst.

Performance parameters of the PEAT resin are as follows:
Intrinsic Viscosity: 0.85 to 0.9 dL/g;
Terminal Carboxyl Group: 6 to 13 mmol/kg;
Diethylene Glycol: 1 to 1.5%;
Melting Point: 195 to 205° C.

The PEAT resin may function in adhering. The stone powder acts as a filler, increasing stability of products. The chain extender may serve to increase a length of the chain, and is not easy to be decomposed in processing. The white mineral oil may serve to lubricate and increase plasticization, thus facilitating extrusion. In addition, the stearic acid also provides a lubricating effect. The chain extender is used together with the white mineral oil and the stearic acid, which makes the products easier to be shaped and not easy to be broken during extrusion.

The printed layer is a PETG (Poly (ethylene terephthalateco-1,4-cylclohexylenedimethylene terephthalate)) white film, a printed film or a digital printed film. The protective layer may be a PETG transparent sheet or halogen-free resin (uv, pur). A surface of the protective layer is provided with textures, which can be pressed by steel plates and rollers or digitally printed. However, it is not limited to this, and the surface of the protective layer may also be with a planar structure.

The substrate may be with a single-layer or a multi-layer structure, and a bottom of the substrate may be provided with a balance layer and/or a silence pad. The balance layer is can be a PETG transparent sheet.

Alternatively, the PEAT resin is prepared by esterification reaction of 65 to 70% of PTA, 13 to 20% of adipic acid, 13 to 20% of ethylene glycol, 0.0012 to 0.0025% of phosphoric acid and its ester derivatives, 1 to 1.5% of diethylene glycol and 0.02 to 0.03% of catalyst, by weight in percent.

Alternatively, the PEAT resin is prepared by esterification reaction of 55 to 60% of PTA, 13 to 20% of adipic acid, 13 to 20% of ethylene glycol, 0.0012 to 0.0025% of phosphoric acid and its ester derivatives, 1 to 1.5% of diethylene glycol, 0.02 to 0.03% of catalyst and 10 to 15% of recycled PET, by weight in percent.

PET is polyethylene terephthalate. The recycled PET is from recycled beverage bottle flake. With the recycled PET, it is more environmentally friendly and does not affect overall performance of the prepared plastic board.

Alternatively, the catalyst is an antimony based catalyst, specifically ethylene glycol antimony. Since a structure of the ethylene glycol antimony has similar groups to that of ethylene glycol, according to similar miscibility principle, the ethylene glycol antimony has large solubility in ethylene glycol, good dispersibility, and has high antimony content and good activity, which facilitates esterification reaction.

Optionally, the chain extender is a copolymer containing epoxy functional groups. The active epoxy groups contained in the chain extender can react with carboxyl groups at a chain end of the PEAT resin, and a ring-opening temperature of the epoxy group is low, thus with high chain extension efficiency. Specifically, it can be 2-methyl-2-propenoic acid oxiranylmethyl ester, which, together with the PEAT resin condensed and prepared by the esterification reaction, has ester groups, which does not bring in new impurities.

Optionally, the PE is HDPE (high density polyethylene). HDPE has a high melting point, suitable for high temperature processing, with superior hardness, tensile strength, and creep resistance over low density polyethylene.

Performance parameters of HDPE are as follows:
Molecular Weight: greater than 25 million;
Density: 0.940 to 0.976 g/cm$^3$;
Crystallinity: 80% to 90%;
Softening Point: 125 to 135° C.

A method of forming a halogen-free modified high-filling recyclable plastic board is further provided in the disclosure, specifically including following steps (1) to (4).

(1) PEAT resin, stone powder, chain extender, white mineral oil, PE, and stearic acid were stirred at a high speed until a stirring temperature reaches 100° C. and then stirring is stopped.

(2) Extrusion molding is made by an extruder with multi-stage extrusion temperatures, pressing into sheets is performed by a steel roller so as to form a substrate layer;

(3) A printed layer is formed on a surface of the substrate layer by digital printing, rolling or adhering a patterned film layer.

(4) The protective layer is adhered or coated on the printed layer and then the protective layer is embossed to form a plastic board.

The multi-stage extrusion temperatures include five stages of extrusion temperatures sequentially set from high to low, the multi-stage extrusion temperatures range from 185 to 210° C., and duration for each of the stages of extrusion temperatures is from 13 to 17 s. Because of greater amount of stone powder in early stages, it is necessary to be with better plasticization in the first three stages, so warming is required. Further, vacuum treatment is performed between the third and fourth stages of temperatures with a vacuum of 0.8 mpa, so as to pump away gases generated or carried in processing, so that there is no bubble inside the board. In order to ensure full plasticization in the first three stages, it is necessary to process at a higher temperature, so as to avoid unplasticized or powdery materials being vacuumed away. The temperature after the plasticization needs to be reduced as materials are softer at a high temperature, such that the materials cannot be extruded and molded well, and thus the temperature is reduced. An extruder and a dispersing mixer are matched equipment, stirring is performed in the dispersing mixer with the stirring temperature will gradually increase during high-speed stirring.

When a surface of the substrate layer is digitally printed to form a printed layer, uv (such as uv varnish or the like) can be coated on a surface of the printed layer for pattern protection.

Test data of the plastic board made by the above method is shown in Table 1 below.

TABLE 1

Test Content and Results for Plastic Board

| Test Content | Detection Standard | Result |
|---|---|---|
| Dimensional Stability | ISO23999 | 0.08% |
| Warping | ISO23999 | 0.2 mm |
| Residual Indentation | ISO24343-1 | 0.01 mm |
| Wear | EN13329 | AC4 |
| Needle Scratch | ISO1518-1 | 2700 g |
| Martindale | EN16094 | A1B1 |
| Wheelchair Test 25000r | ISO4918 | Pass |
| Phthalate Detection | EN14372 | ND |
| Heavy Metal | ASTMF963 | Pass |
| Formaldehyde | EN717-1 | ND |

Benefits of the present disclosure is that the plastic board prepared according to the present disclosure generally has no halogen element. Filling amount of stone powder in the substrate layer is >70%, and the prepared plastic board presents thermal stability as follows: shrinkage of less than or equal to 0.08% and expansion of less than or equal to 0.15% at 80° C. A surface of the substrate can be directly attached with a PETG film, or directly printed by digital printing without glue; and the PEAT resin can be partially replaced by recycled PET so as to reduce carbon emissions. In addition, materials of portions of the board may be compatible, and scrapped boards can be subjected to direct crushing for reprocessing.

DETAILED DESCRIPTION

In the following, a detailed and complete description of the present disclosure will be made with specific embodiments.

Embodiment 1

16 parts of PEAT resin, 50 parts of stone powder, 0.5 parts of chain extender, 0.8 parts of white mineral oil, 0.4 parts of stearic acid and 3 parts of PE (by weight) were stirred at a high speed. When a stirring temperature reached 100° C., stirring was stopped, and materials were fed by a feeder and extruded by a twin-screw extruder. Five stages of extrusion temperatures were set at 210° C., 200° C., 195° C., 190° C. and 185° C. respectively, with duration for each of stages of extrusion temperatures of 15 s. Vacuum treatment is performed between the third and fourth stages of temperatures with a vacuum of 0.8 mpa, and with temperatures at both ends of a mold being set at 210° C. and a temperature at its middle part being set at 200° C., extrusion is performed and pressing into sheets is performed by two steel rollers with temperatures of both steel rollers of 140° C. At the same time, a PETG printed layer and a PETG transparent sheet (with 0.01 mm embossing on a bonding surface thereof) are bonded on its surface by a rubber roller, and then pressing is performed by two steel rollers, with a temperature of an upper steel roller with embossing of 150° C. and a temperature of a lower steel roller of 140° C. The compounded board was cooled to 50° C. for cutting into slices.

Embodiment 2

16 parts of PEAT resin, 55 parts of stone powder, 0.5 parts of chain extender, 0.8 parts of white mineral oil, 0.4 parts of stearic acid and 3 parts of PE (by weight) were stirred at a high speed. When a stirring temperature reached 100° C., stirring was stopped, and materials were fed by a feeder and extruded by a twin-screw extruder. Five stages of extrusion temperatures were set at 210° C., 205° C., 200° C., 190° C. and 185° C. respectively, with duration for each of stages of extrusion temperatures of 15 s. Vacuum treatment is performed between the third and fourth stages of temperatures with a vacuum of 0.8 mpa, and with temperatures at both ends of a mold being set at 210° C. and a temperature at its middle part being set at 200° C., extrusion is performed and pressing into sheets is performed by two steel rollers so as to obtain the substrate layer. A surface of the substrate layer is digitally printed to form the printed layer, uv can be coated on a surface of the printed layer for pattern protection, and texture is provided by digital 3D printing.

Embodiment 3

16 parts of PEAT resin, 55 parts of stone powder, 0.5 parts of chain extender, 0.8 parts of white mineral oil, 0.4 parts of stearic acid and 3 parts of PE (by weight) were stirred at a high speed. When a stirring temperature reached 100° C., stirring was stopped, and materials were fed by a feeder and extruded by a twin-screw extruder. Five stages of extrusion temperatures were set at 210° C., 205° C., 200° C., 190° C. and 185° C. respectively, with duration for each of stages of extrusion temperatures of 15 s. Vacuum treatment is performed between the third and fourth stages of temperatures with a vacuum of 0.8 mpa, and with temperatures at both ends of a mold being set at 210° C. and a temperature at its middle part being set at 200° C., extrusion is performed and pressing into sheets is performed by two steel rollers. A PETG printed layer was placed on a surface of the substrate and a PETG transparent sheet was placed on a surface of the printed layer to respectively form a protective layer and a balance layer at a bottom of the substrate, and steel plates was placed on top and bottom thereof to press using a press. A hot pressing temperature of the press is 130° C., a pressure of the press is set to be with three sections of 4, 5 and 6 mpa, with duration for respective sections being 6 minutes, 8 minutes and 8 minutes, respectively; and a cold machine is set to be with a temperature of 35° C., and the pressure is set to three sections of 8, 9 and 10 mpa, with duration for respective sections being 6 minutes, 10 minutes and 10 minutes, respectively, so as to obtain the plastic board.

The above is only preferred embodiments of the present disclosure, which does not limit a protection scope of the present disclosure. Any equivalent structural transformation made with content of the specification of the present disclosure, which is directly or indirectly applied to other related technical fields, is included within the scope of the disclosure.

The invention claimed is:

1. A halogen-free modified high-filling recyclable plastic board, comprising a substrate layer, and a printed layer and a protective layer disposed sequentially on the substrate layer from bottom to top; wherein raw materials of the substrate layer include, by weight in percent, 20 to 25% of polyethylene terephthalate-co-polyethylene adipate (PEAT) resin, 70 to 75% of stone powder, 0.5 to 0.8% of chain extender, 1 to 2% of white mineral oil, 3 to 6% polyethylene (PE), and 0.4 to 0.8% stearic acid.

2. The halogen-free modified high-filling recyclable plastic board according to claim 1, wherein the PEAT resin is prepared by esterification reaction of 65 to 70% of Pure Terephthalic Acid (PTA), 13 to 20% of adipic acid, 13 to 20% of ethylene glycol, 0.0012 to 0.0025% of phosphoric acid and its ester derivatives, 1 to 1.5% of diethylene glycol and 0.02 to 0.03% of catalyst, by weight in percent.

3. The halogen-free modified high-filling recyclable plastic board according to claim 2, wherein the catalyst is ethylene glycol antimony.

4. The halogen-free modified high-filling recyclable plastic board according to claim 1, wherein the PEAT resin is prepared by esterification reaction of 55 to 60% of PTA, 13 to 20% of adipic acid, 13 to 20% of ethylene glycol, 0.0012 to 0.0025% of phosphoric acid and its ester derivatives, 1 to 1.5% of diethylene glycol, 0.02 to 0.03% of catalyst and 10 to 15% of recycled polyethylene terephthalate (PET), by weight in percent.

5. The halogen-free modified high-filling recyclable plastic board according to claim 3, wherein the catalyst is ethylene glycol antimony.

6. The halogen-free modified high-filling recyclable plastic board according to claim 1, wherein the chain extender is 2-methyl-2-propenoic acid oxiranylmethyl ester.

7. The halogen-free modified high-filling recyclable plastic board according to claim 1, wherein the PE is high density polyethylene (HDPE).

8. The halogen-free modified high-filling recyclable plastic board according to claim 1, wherein a lower surface of the substrate layer is provided with a balance layer, the protective layer and the balance layer being all poly (ethylene terephthalate-co-1,4-cylclohexylenedimethylene terephthalate) (PETG) transparent sheets.

* * * * *